(12) United States Patent
Greene (10) Patent No.: US 10,070,691 B2
(45) Date of Patent: Sep. 11, 2018

(54) ARTICLE OF FOOTWEAR INCLUDING A BLADDER ELEMENT HAVING A CUSHIONING COMPONENT WITH A SINGLE CENTRAL OPENING AND A CUSHIONING COMPONENT WITH MULTIPLE CONNECTING FEATURES AND METHOD OF MANUFACTURING

(71) Applicant: NIKE, Inc., Beaverton, OR (US)

(72) Inventor: Pamela S. Greene, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 62 days.

(21) Appl. No.: 14/931,287

(22) Filed: Nov. 3, 2015

(65) Prior Publication Data

US 2017/0119096 A1    May 4, 2017

(51) Int. Cl.
*A43B 13/20* (2006.01)
*A43B 13/18* (2006.01)

(52) U.S. Cl.
CPC .......... *A43B 13/206* (2013.01); *A43B 13/187* (2013.01)

(58) Field of Classification Search
CPC ...... A43B 13/20; A43B 13/203; A43B 13/206
USPC .......................................... 36/29, 153, 35 B
See application file for complete search history.

(56) References Cited

U.S. PATENT DOCUMENTS

| 896,075 | A | 8/1908 | Badgley |
| 1,498,838 | A | 6/1924 | Harrison, Jr. |
| 1,771,793 | A | 7/1930 | Kind |
| D164,456 | S | 9/1951 | Sprigg |
| D164,457 | S | 9/1951 | Sprigg |
| 4,123,855 | A * | 11/1978 | Thedford ............. A43B 1/0045 36/153 |
| 4,183,156 | A | 1/1980 | Rudy |
| 4,219,945 | A * | 9/1980 | Rudy ................... A43B 13/203 36/29 |
| 4,523,393 | A | 6/1985 | Inohara |

(Continued)

FOREIGN PATENT DOCUMENTS

| EP | 0876113 B1 | 7/2003 |
| WO | 0119211 A1 | 3/2001 |

OTHER PUBLICATIONS solereview.com Product Review, "Nike Air Max 2014 Review", May 28, 2014, 18 pps., http://www.solereview.com/nike-air-max-2014-review/, printed Mar. 23, 2015.

*Primary Examiner* — Ted Kavanaugh
(74) *Attorney, Agent, or Firm* — Quinn IP Law (57) ABSTRACT

An article of footwear is disclosed that comprises a sole structure having a bladder element that includes multiple cushioning components. Each cushioning component includes an enclosed fluid-filled cavity. The cushioning components may include a first cushioning component and a second cushioning component. The first cushioning component has a single central opening extending completely therethrough, and a continuous fluid-filled cavity surrounding the central opening. The second cushioning component has multiple connecting features positioned inward of an outer periphery of the second cushioning component. The connecting features connect a first side of the second cushioning component to a second side of the second cushioning component opposite the first side. A method of manufacturing an article of footwear with such cushioning components is disclosed.

18 Claims, 7 Drawing Sheets

(56) References Cited

U.S. PATENT DOCUMENTS

| | | |
|---|---|---|
| 4,934,071 A | 6/1990 | Virgini |
| 4,936,029 A | 6/1990 | Rudy |
| 5,042,176 A | 8/1991 | Rudy |
| 5,195,257 A * | 3/1993 | Holcomb ............. A43B 13/203 36/28 |
| 5,353,523 A | 10/1994 | Kilgore et al. |
| D376,897 S | 12/1996 | Passke et al. |
| D376,898 S | 12/1996 | Passke et al. |
| D376,899 S | 12/1996 | Passke et al. |
| D377,110 S | 1/1997 | Passke et al. |
| D377,111 S | 1/1997 | Passke et al. |
| D377,112 S | 1/1997 | Passke et al. |
| D377,113 S | 1/1997 | Passke et al. |
| D377,559 S | 1/1997 | Passke et al. |
| 5,598,645 A | 2/1997 | Kaiser |
| D378,629 S | 4/1997 | Passke et al. |
| 5,669,161 A | 9/1997 | Huang |
| D385,394 S | 10/1997 | Passke et al. |
| D386,289 S | 11/1997 | Passke et al. |
| D386,290 S | 11/1997 | Passke et al. |
| D386,894 S | 12/1997 | Passke et al. |
| 5,713,141 A | 2/1998 | Mitchell et al. |
| D411,912 S * | 7/1999 | Van Noy ........................ D2/946 |
| 5,933,983 A | 8/1999 | Jeon |
| 5,952,065 A | 9/1999 | Mitchell et al. |
| 6,013,340 A | 1/2000 | Bonk et al. |
| 6,082,025 A | 7/2000 | Bonk et al. |
| 6,127,026 A | 10/2000 | Bonk et al. |
| 6,203,868 B1 | 3/2001 | Bonk et al. |
| 6,321,465 B1 | 11/2001 | Bonk et al. |
| 6,385,864 B1 | 5/2002 | Sell, Jr. et al. |
| 6,463,612 B1 | 10/2002 | Potter |
| 6,749,187 B2 | 6/2004 | Yang |
| 6,880,267 B2 | 4/2005 | Smaldone et al. |
| 7,013,581 B2 | 3/2006 | Greene et al. |
| 7,076,891 B2 | 7/2006 | Goodwin |
| 7,244,483 B2 | 7/2007 | Tawney et al. |
| D547,932 S | 8/2007 | Loverin |
| 7,448,150 B1 * | 11/2008 | Davis ................... A43B 13/203 36/153 |
| 7,707,744 B2 | 5/2010 | Schindler et al. |
| 7,810,256 B2 | 10/2010 | Goodwin et al. |
| 7,937,856 B2 | 5/2011 | Cook et al. |
| 8,850,718 B2 | 10/2014 | Lubart |
| D719,335 S | 12/2014 | Lindner et al. |
| 8,961,844 B2 | 2/2015 | Baghdadi et al. |
| 2002/0035794 A1 | 3/2002 | Doyle |
| 2002/0050077 A1 | 5/2002 | Wang et al. |
| 2005/0097777 A1 * | 5/2005 | Goodwin ............... A43B 13/20 36/29 |
| 2007/0107266 A1 * | 5/2007 | Sun ........................ A43B 7/143 36/127 |
| 2011/0138654 A1 | 6/2011 | Cook et al. |
| 2012/0233885 A1 | 9/2012 | Shaffer et al. |
| 2012/0291313 A1 | 11/2012 | Peyton et al. |
| 2012/0304501 A1 | 12/2012 | Song |
| 2013/0167401 A1 * | 7/2013 | Christensen ........... A43B 13/20 36/29 |
| 2013/0212909 A1 * | 8/2013 | Bates ................... A43B 13/189 36/102 |
| 2013/0276329 A1 | 10/2013 | James |
| 2014/0020264 A1 | 1/2014 | Holt |
| 2014/0182167 A1 | 7/2014 | James et al. |
| 2014/0215849 A1 | 8/2014 | Litchfield et al. |
| 2014/0230276 A1 * | 8/2014 | Campos, II .......... B29D 35/122 36/84 |
| 2014/0250726 A1 | 9/2014 | Meschter |
| 2014/0283413 A1 * | 9/2014 | Christensen ......... A43B 3/0057 36/102 |
| 2014/0310991 A1 | 10/2014 | Greene et al. |
| 2015/0272271 A1 * | 10/2015 | Campos, II .......... B29D 35/122 36/29 |

* cited by examiner

ARTICLE OF FOOTWEAR INCLUDING A BLADDER ELEMENT HAVING A CUSHIONING COMPONENT WITH A SINGLE CENTRAL OPENING AND A CUSHIONING COMPONENT WITH MULTIPLE CONNECTING FEATURES AND METHOD OF MANUFACTURING

TECHNICAL FIELD

The present teachings generally include an article of footwear with a sole structure having a bladder element, and a method of manufacturing a sole structure of an article of footwear.

BACKGROUND

Footwear typically includes a sole configured to be located under a wearer's foot to space the foot away from the ground or floor surface. Athletic footwear in particular sometimes utilizes polyurethane foam or other resilient materials in the sole to provide cushioning. Fluid-filled bladders are sometimes included in the sole to provide desired impact force absorption, motion control, and resiliency.

DESCRIPTION

An article of footwear is disclosed that comprises a sole structure having a bladder element that includes multiple cushioning components. Each cushioning component includes an enclosed fluid-filled cavity. The cushioning components include a first cushioning component and a second cushioning component. The first cushioning component has a single central opening extending completely therethrough, and a continuous fluid-filled cavity surrounding the central opening. The second cushioning component has multiple connecting features positioned inward of an outer periphery of the second cushioning component. The connecting features connect a first side of the second cushioning component to a second side of the second cushioning component opposite the first side.

In an embodiment, the cushioning components are spaced apart from one another so that an outer surface of each of the cushioning components is substantially decoupled from an outer surface of an adjacent one of the cushioning components.

In an embodiment, the first cushioning component is a regular ring torus or an irregular ring torus.

In an embodiment, the connecting features are tubular pillars. At least one of the tubular pillars may comprise an opening extending completely through said at least one of the tubular pillars. The tubular pillar with the opening extending completely therethrough may be hollow.

In an embodiment, the connecting features are tethers positioned within the fluid-filled cavity of the second cushioning component.

In an embodiment, the cushioning components comprise a third cushioning component and a fourth cushioning component. The third cushioning component includes a single central opening extending completely therethrough, and a continuous fluid-filled cavity surrounding the central opening of the third cushioning component. The fourth cushioning component includes multiple connecting features positioned inward of an outer periphery of the fourth cushioning component and connecting a first side of the fourth cushioning component to a second side of the fourth cushioning component opposite the first side of the fourth cushioning component. The first cushioning component is positioned between a medial extremity of the sole structure and the third cushioning component. The third cushioning component is positioned between a lateral extremity of the sole structure and the first cushioning component. The second cushioning component is positioned between the medial extremity of the sole structure and the fourth cushioning component. The fourth cushioning component is positioned between the lateral extremity of the sole structure and the second cushioning component.

In an embodiment, the cushioning components further comprise a fifth cushioning component that has a single central opening extending completely therethrough, and a continuous fluid-filled cavity surrounding the central opening of the fifth cushioning component. The fifth cushioning component is rearward of the third cushioning component and positioned in a midfoot portion of the sole structure.

In an embodiment, the first cushioning component and the second cushioning component are both positioned in a forefoot portion of the sole structure, and the second cushioning component is positioned forward of the first cushioning component.

In an embodiment, the second cushioning component is in a heel portion of the article of footwear and includes tubular portions extending along a periphery of the sole structure in the heel portion.

In an embodiment, the cushioning components comprise a tubular cushioning component extending lengthwise along a medial extremity of the sole structure in a midfoot portion of the sole structure.

In an embodiment, the bladder element includes channels connecting adjacent ones of the cushioning components and establishing fluid communication between said adjacent ones of the cushioning components. At least one of the channels may be sealed so that the adjacent ones of the cushioning components connected by the sealed channel are isolated from fluid communication with one another by the sealed channel. The adjacent ones of the cushioning components connected by the sealed channel may have different inflation pressures.

In an embodiment, a gap is provided between adjacent ones of the cushioning components and extends from a medial extremity to a lateral extremity of the sole structure.

Substantially decoupling the cushioning components allows at least some of the outer surfaces of the cushioning components to be surrounded by or encased in foam in some embodiments. Gaps between the lengths of the tubes may be filled with the foam, or may be free from foam or other structure. The foam-filled or empty gaps allow for increased fore-aft flexibility of the sole structure in comparison to a bladder element in which outer surfaces of adjacent cushioning components are not substantially decoupled.

An article of footwear is disclosed that comprises a sole structure having a bladder element that includes a cushioning component. The cushioning component includes a fluid-filled cavity and multiple tubular pillars that are positioned inward of an outer periphery of the cushioning component. The tubular pillars connect a first side of the cushioning component to a second side of the cushioning component opposite the first side such that the fluid-filled cavity surrounds the tubular pillars. At least one of the tubular pillars comprises an opening extending completely therethrough.

In an embodiment, the article of footwear further comprises an additional cushioning component. The additional cushioning component includes a single central opening extending completely therethrough, a continuous fluid-filled cavity surrounding the central opening. The bladder element further comprises a channel connecting the cushioning component to the additional cushioning component.

In an embodiment, the cushioning component is in one of a forefoot portion of the sole structure and a heel portion of the sole structure. For example, the cushioning component may be in the heel portion of the sole structure and may include tubular portions extending along an edge of the sole structure in the heel portion.

In an embodiment, the channel is sealed such that the fluid-filled cavity of the cushioning component is isolated from fluid communication with the fluid-filled cavity of the additional cushioning component by the sealed channel.

A method of manufacturing a sole structure of an article of footwear comprises forming a bladder element having multiple cushioning components. Each cushioning component includes a fluid-filled cavity. The cushioning components comprise a first cushioning component that has a single central opening extending completely therethrough, and has a continuous fluid-filled cavity surrounding the central opening. The cushioning components further comprise a second cushioning component that has multiple connecting features positioned inward of an outer periphery of the second cushioning component and that connect a first side of the second cushioning component to a second side of the second cushioning component opposite the first side. The second cushioning component is substantially decoupled from the first cushioning component.

In an embodiment of the method, the multiple connecting features are hollow tubes, and forming the bladder element includes positioning polymeric sheets in the mold assembly and thermoforming the polymeric sheets in the mold assembly to include tubular pillars. The method further comprises punching holes in the polymeric sheets at the tubular pillars so that the tubular pillars are hollow.

In an embodiment of the method, forming the bladder element comprises forming channels connecting adjacent ones of the cushioning components to establish fluid communication between the adjacent ones of the cushioning components, and forming an inflation port disposed at a periphery of the bladder element and in fluid communication with the adjacent ones of the cushioning components via the channels. The method further comprises inflating the bladder element through the inflation port to a first inflation pressure, closing one of the channels to form a sealed first portion of the bladder element, and inflating a remaining unsealed portion of the bladder element through the inflation port to a second inflation pressure, thereby establishing different inflation pressures in different ones of the cushioning components separated from one another by the closed channel.

In an embodiment, the method further comprises at least partially covering an outer surface of at least one of the cushioning components with foam.

The above features and advantages and other features and advantages of the present teachings are readily apparent from the following detailed description of the modes for carrying out the present teachings when taken in connection with the accompanying drawings.

"A," "an," "the," "at least one," and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range. All references referred to are incorporated herein in their entirety.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Those having ordinary skill in the art will recognize that terms such as "above," "below," "upward," "downward," "top," "bottom," etc., are used descriptively relative to the figures, and do not represent limitations on the scope of the invention, as defined by the claims.

Figure 1:
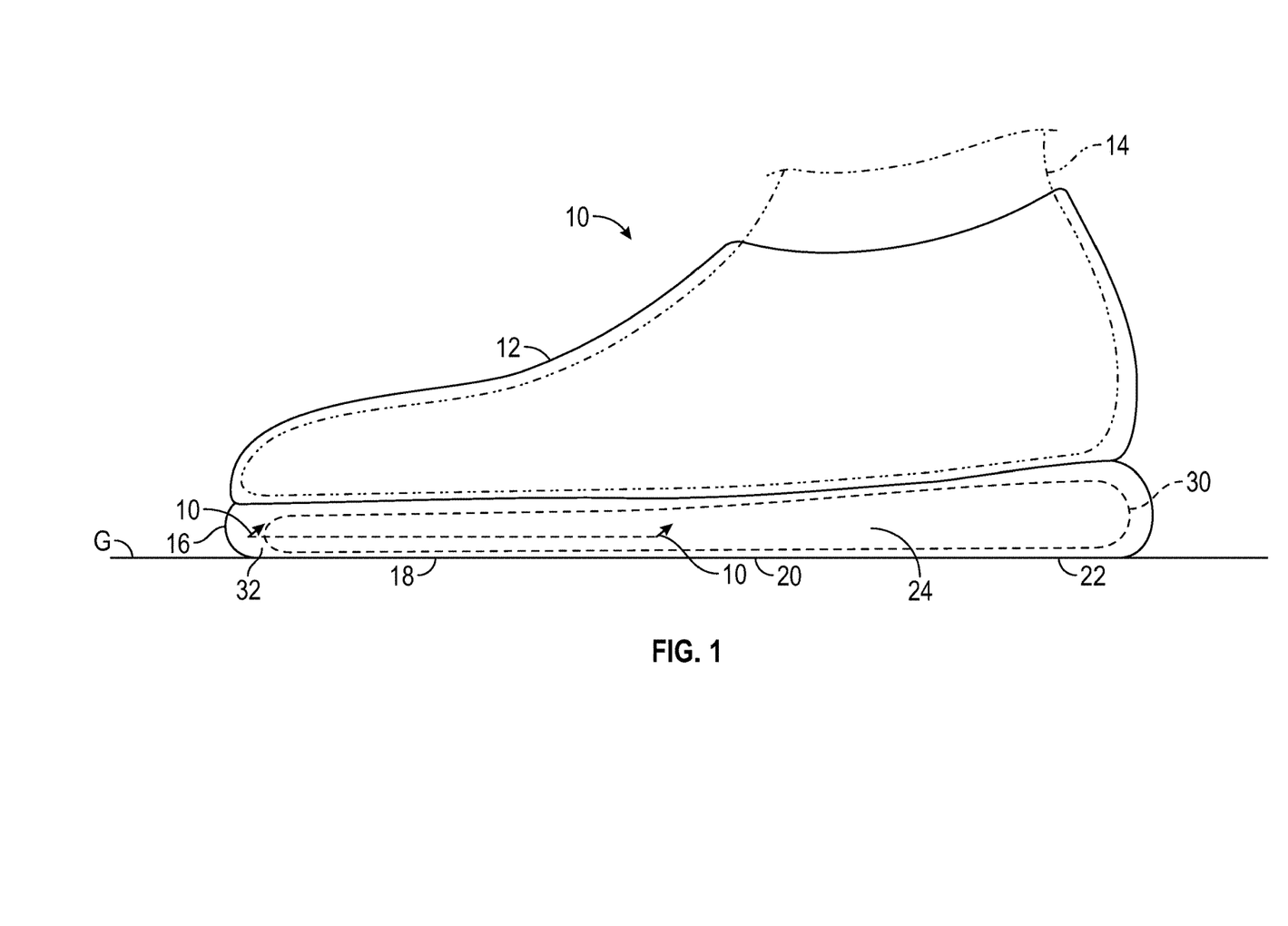
FIG. 1 is a schematic illustration in side view of an article of footwear having a sole structure and showing a bladder element with hidden lines.

Referring to the drawings wherein like reference numbers refer to like components throughout the several views, FIG. 1 shows an article of footwear 10 in a lateral side view. As shown, the article of footwear 10 is an athletic shoe. In other embodiments, the article of footwear 10 could be for another category of footwear, such as a dress shoe, a work shoe, a sandal, a slipper, or a boot.

The article of footwear 10 includes an upper 12 configured with a cavity that receives a foot 14 of a wearer. The upper 12 can be a variety of flexible materials such as textiles, and fabrics, and may include plastic support components. The upper 12 may be multiple pieces sewn, knitted, or bonded to one another. The upper 12 may include a lacing system or may be a slip-on sock. The upper 12 may further include support elements, such as a heel counter. The upper 12 is shown worn on the foot 14, which is shown in phantom.

The article of footwear 10 includes a sole structure 16 operatively secured to the upper 12 and providing cushioning between the foot 14 and the ground G. The article of footwear 10 and the sole structure 16 have a forefoot portion 18, a midfoot portion 20, and a heel portion 22. The forefoot portion 18 generally includes portions of the sole structure 16 corresponding with the toes and the joints connecting the metatarsals with the phalanges of the foot 14. The midfoot portion 20 generally corresponds with an arch area of the foot 14, and extends from the forefoot portion 18 to a heel portion 22. The heel portion 22 generally corresponds with rear portions of the foot 14, including the calcaneus bone, with the foot 14 corresponding in size to the article of footwear 10. The heel portion 22 is defined as approximately the rear third of the sole structure 16. The midfoot portion 20 is defined as the middle third of the sole structure 16. The forefoot portion 18 is defined as the front third of the sole structure 16. A perimeter P of the sole structure 16 surrounds the forefoot portion 18, the midfoot portion 20, and the heel portion 22. The article of footwear 10 shown is for a left foot. A pair of footwear includes the article of footwear 10, and an article of footwear for a right foot that is a mirror image of the article of footwear 10.

Figure 2:
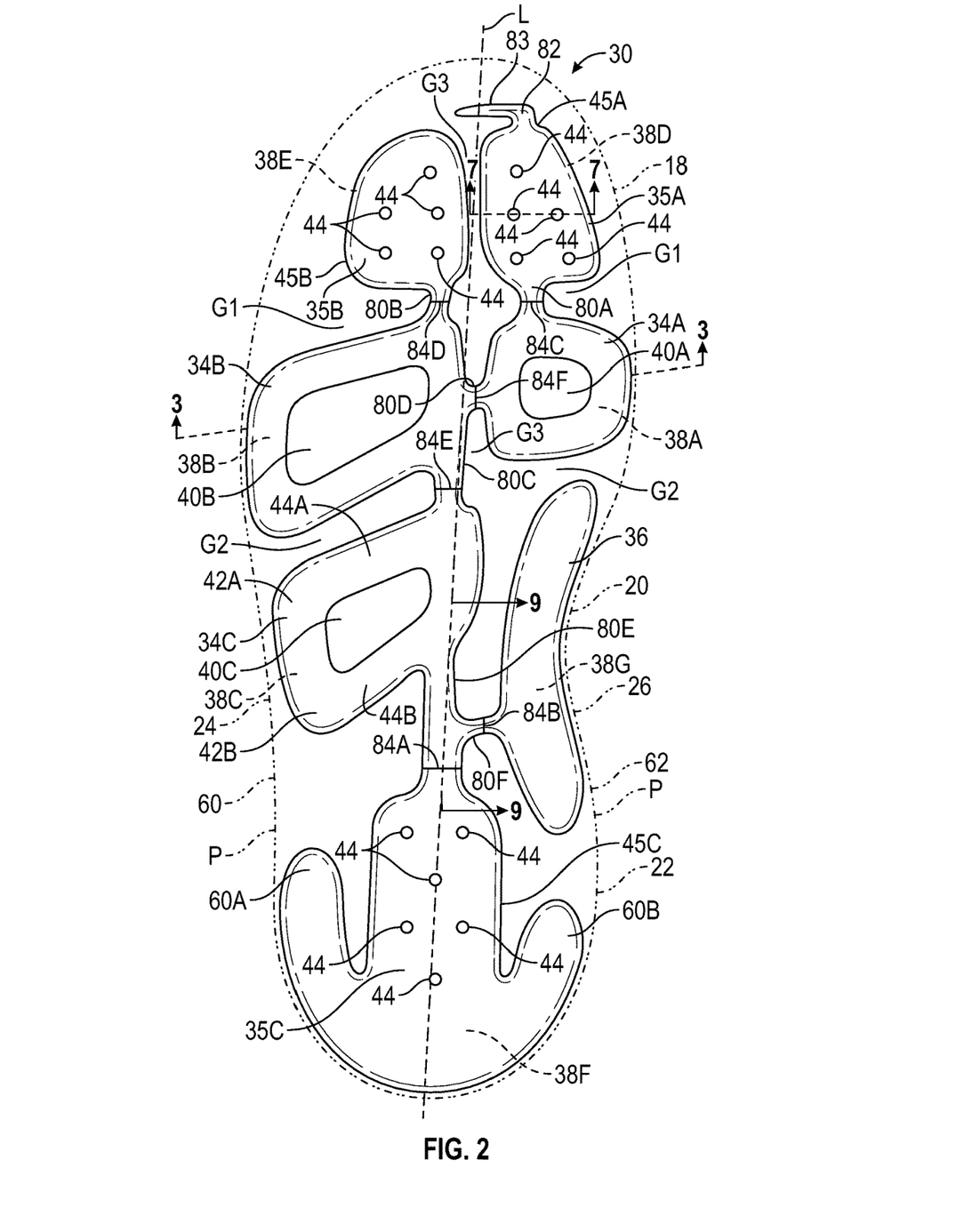
FIG. 2 is a schematic illustration in plan view of the bladder element of FIG. 1 showing a perimeter of the sole structure in phantom.

The sole structure 16 has a lateral side 24 best shown in FIG. 1, and a medial side 26 indicated in FIG. 2. The lateral side 24 includes all portions of the sole structure 16 on a side of a longitudinal midline L closest to a lateral side of the foot 14. The medial side 26 includes all portions of the sole structure 16 on a side of the longitudinal midline L closest to a medial side of the foot 14. The lateral side 24 of the sole structure 16 is a side that corresponds with the side of the foot 14 that is generally further from the other foot of the wearer (i.e., the side closer to the fifth toe of the wearer). The fifth toe is commonly referred to as the little toe. The medial side 26 of the sole structure 16 is the side that corresponds with an inside area of the foot 14 and is generally closer to the other foot of the wearer (i.e., the side closer to the hallux of the foot of the wearer). The hallux is commonly referred to as the big toe.

The sole structure 16 includes a fluid-filled bladder element 30 shown and discussed in further detail with respect to FIG. 2. In FIG. 1, the sole structure 16 also includes foam 32 that covers at least some of the outer surfaces of the bladder element 30. For example, the foam 32 may be but is not limited to ethylene vinyl acetate (EVA) foam or polyurethane foam. In addition to foam 32, the sole structure 16 may include an outsole or discreet outsole elements (not shown) between the foam 32 and the ground G or directly attached to the bladder element 30 between the bladder element 30 and the ground G. For example, the outsole or outsole elements may be rubber or another relatively durable material for providing traction and grip. Alternatively, the foam 32 may serve as a unitary midsole and outsole. The sole structure 16 may also include various support elements, such as one or more plates that may also be encased in the foam 32. Still further, no foam may be used. For example, the bladder element 30 could instead be directly attached to the upper 12, or a layer could be attached to the upper 12 and the bladder element 30 could be attached to a ground-facing side of the layer. For example, the layer could be a midsole layer or a layer with differential stiffness. Outsole elements may be attached to or made integral with the bladder element 30 in such an embodiment.

The bladder element 30 is a polymeric material capable of retaining a pressurized fluid. For example, the bladder element 30 may comprise a thermoplastic polyurethane material (TPU). Optionally the TPU may be recyclable and regrindable, and may be made from recycled TPU, allowing the material of the bladder element 30 to be recycled and reused.

The bladder element 30 may be blow molded or alternatively may be thermoformed from upper and lower sheets. The sheets may have alternating layers of TPU and a gas barrier material. In any embodiment, the bladder element 30 is configured to retain fluid within the fluid-filled chambers. As used herein, a "fluid" includes a gas, including air, an inert gas such as nitrogen, or another gas. Accordingly, "fluid-filled" includes "gas-filled". The various materials used for the bladder element 30 may be substantially transparent or may have a tinted color. For example, the bladder element 30 can be formed from any of various polymeric materials that can retain a fluid at a predetermined pressure, including a fluid that is a gas, such as air, nitrogen, or another gas. For example, the bladder element 30 can be a TPU material, a urethane, polyurethane, polyester, polyester polyurethane, and/or polyether polyurethane.

Moreover, in one embodiment, the bladder element 30 can be formed of one or more sheets having layers of different materials. The sheets may be laminate membranes formed from thin films having one or more first layers that comprise thermoplastic polyurethane layers and that alternate with one or more second layers, also referred to herein as barrier layers, gas barrier polymers, or gas barrier layers. The second layers may comprise a copolymer of ethylene and vinyl alcohol (EVOH) that is impermeable to the pressurized fluid contained therein as disclosed in U.S. Pat. No. 6,082,025 to Bonk et al., which is incorporated by reference in its entirety. The first layer may be arranged to form an outer surface of the polymeric sheet. That is, the outermost first layer may be the outer surface of the bladder element 30. The bladder element 30 may also be formed from a material that includes alternating layers of thermoplastic polyurethane and ethylene-vinyl alcohol copolymer, as disclosed in U.S. Pat. Nos. 5,713,141 and 5,952,065 to Mitchell et al. which are incorporated by reference in their entireties. Alternatively, the layers may include ethylene-vinyl alcohol copolymer, thermoplastic polyurethane, and a regrind material of the ethylene-vinyl alcohol copolymer and thermoplastic polyurethane. The bladder element 30 may also be a flexible microlayer membrane that includes alternating layers of a gas barrier polymer material such as second layers and an elastomeric material such as first layers, as disclosed in U.S. Pat. Nos. 6,082,025 and 6,127,026 to Bonk et al. which are incorporated by reference in their entireties. With such alternating layers, for example, the bladder element 30 or any of the additional bladder elements discussed herein may have a gas transmission rate for nitrogen of less than 10 cubic centimeters per square meter per atmosphere per day, or of less than 1 cubic centimeter per square meter per atmosphere per day. Additional suitable materials for the bladder element 30 are disclosed in U.S. Pat. Nos. 4,183,156 and 4,219,945 to Rudy which are incorporated by reference in their entireties. Further suitable materials for the bladder element 30 include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk et al. which are incorporated by reference in their entireties. In selecting materials for the bladder element 30, engineering properties such as tensile strength, stretch properties, fatigue characteristics, dynamic modulus, and loss tangent can be considered. When the bladder element 30 is formed from sheets, the thicknesses of the sheets used to form the bladder element 30 can be selected to provide these characteristics.

The bladder element 30 includes multiple cushioning components. More specifically, the bladder element 30 includes cushioning components 34A, 34B, 34C, 35A, 35B, 35C, and 36. Each cushioning component 34A, 34B, 34C, 35A, 35B, 35C, and 36 includes an enclosed fluid-filled cavity. Cushioning component 34A includes a fluid-filled cavity 38A. Cushioning component 34B includes a fluid-filled cavity 38B. Cushioning component 34C includes a fluid-filled cavity 38C. Cushioning component 35A includes a fluid-filled cavity 38D. Cushioning component 35B includes a fluid-filled cavity 38E. Cushioning component 35C includes a fluid-filled cavity 38F. Cushioning component 36 includes a fluid-filled cavity 38G.

The cushioning components 34A, 34B, and 34C each have a single central opening that extends completely therethrough. As used herein, a "central opening" need not be positioned at a true center of the cushioning component. More specifically, if the cushioning component is a regular torus, the cushioning component will have a center axis and the central opening will be centered at the center axis. If the cushioning component is an irregular torus, the central opening does not have a center axis, and although it is bounded by the material of the cushioning component, the central opening is therefore not centered within the cushioning component.

Cushioning component 34A has a single central opening 40A that extends completely therethrough. The fluid-filled cavity 38A is a continuous fluid-filled cavity that completely surrounds the central opening 40A. Cushioning component 34B has a single central opening 40B that extends completely therethrough. The fluid-filled cavity 38B is a continuous fluid-filled cavity that completely surrounds the central opening 40B. Cushioning component 34C has a single central opening 40C that extends completely therethrough. The fluid-filled cavity 38C is a continuous fluid-filled cavity that completely surrounds the central opening 40C.

Each of the cushioning components 34A, 34B, 34C is a ring torus. As shown, each of the cushioning components 34A, 34B, 34C is an irregular ring torus. Alternatively, one or more of the cushioning components 34A, 34B, 34C could be configured as a regular ring torus. As used herein, an "irregular ring torus" is a surface or solid formed by rotating a closed shape, such as but not limited to a circle, an oval, a square, or a rectangle, around a line that lies in the same plane as the closed shape but does not intersect the closed shape (e.g., like a ring-shaped doughnut), wherein the closed shape varies as it is rotated about the line, the distance from the line varies as the closed shape is rotated about the line, or both vary. A "regular ring torus" is a surface or solid formed by rotating a closed shape, such as but not limited to a circle, an oval, a square, or a rectangle, around a line that lies in the same plane as the closed shape but does not intersect the closed shape (e.g., like a ring-shaped doughnut), wherein neither the closed shape nor the distance from the line varies as the closed shape is rotated about the line.

Figure 4:
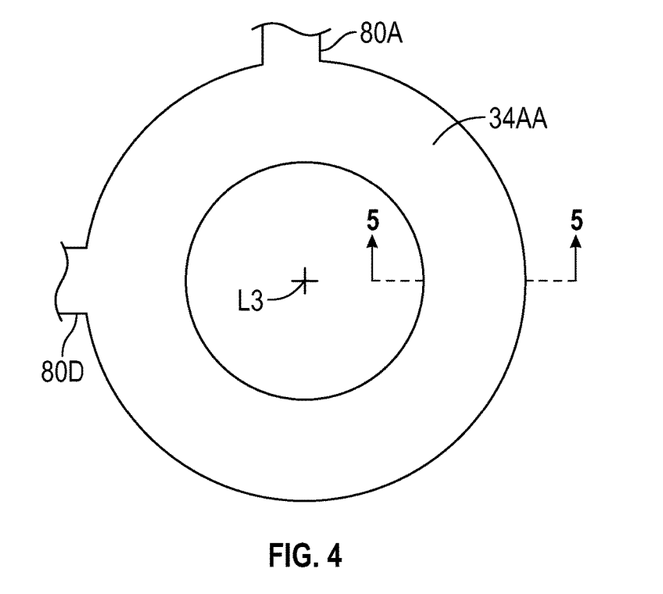
FIG. 4 is a schematic illustration in fragmentary plan view of an alternative configuration of a cushioning component for the bladder element of FIG. 2.
Figure 5:
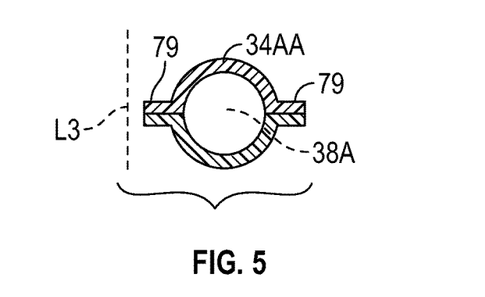
FIG. 5 is a schematic cross-sectional illustration of the cushioning component of FIG. 4 taken at lines 5-5 in FIG. 4.

FIG. 4 is an example of a cushioning component 34AA that is a regular ring torus and that could be used in place of cushioning component 34A. The cushioning component 34AA is a closed circle in cross-section (and with a flange 79 as discussed herein) that is rotated around the line L3 illustrated in FIG. 5 to form the ring torus of FIG. 4. The cushioning component 34AA is thus equidistant from the line L3 at any cross-section of the cushioning component 34AA through a plane that includes the line L3, and the line L3 is thus a center axis of the cushioning component 34AA. Alternatively, if the cushioning component 34AA is blow molded, it will not include the flange 79.

Figure 6:
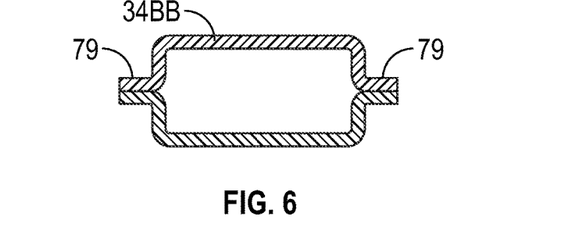
FIG. 6 is a schematic cross-sectional illustration of another alternative configuration of a cushioning component of the bladder element of FIG. 2.

FIG. 6 is another example of a cushioning component 34BB that can be used in place of the cushioning component 34 and the cushioning component 34AA. The cushioning component 34BB is substantially a closed rectangle in cross-section and, like cushioning component 34A, is rotated around the line L3 and is a regular ring torus. The cushioning components 34A, 34B, 34C are each an irregular ring torus because none of these are configured to be equidistant from a center axis such as line L3. Additionally, each is an irregular ring torus because the closed shape of the component in cross-section varies and is not uniform at all cross-sections taken in a plane that includes an axis through the central opening. For example, it is apparent in FIG. 2 that a cross-section of the cushioning component 34C would be wider at corners 42A, 42B than along relatively straight portions 44A, 44B.

By configuring each cushioning component 34A, 34B, 34C as a regular or irregular ring torus, a relatively large cushioning area is provided while the overall height of the cushioning component is relatively small in comparison to its width. For example, if the cushioning component 34A did not have the center opening 40A, it would tend to inflate in a ball shape, causing it to be much higher at its center. Additionally, the central opening 40A allows deflection of the cushioning component 34A downward and inward toward the central opening 40A.

Figure 3:
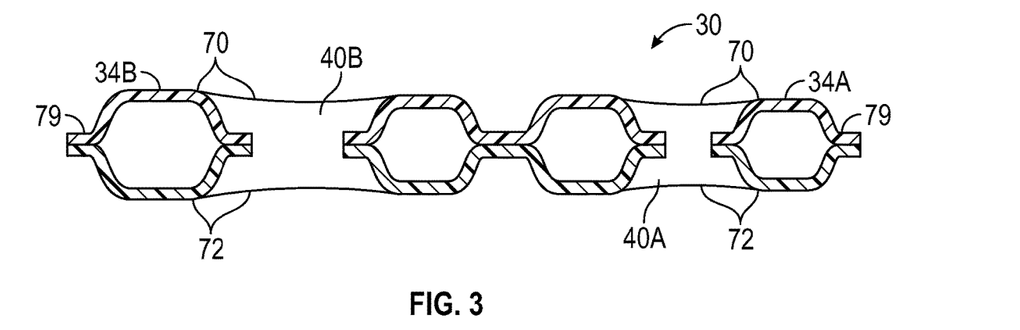
FIG. 3 is a schematic cross-sectional illustration of a first cushioning component the bladder element of FIG. 2 taken at lines 3-3 in FIG. 2.
Figure 7:
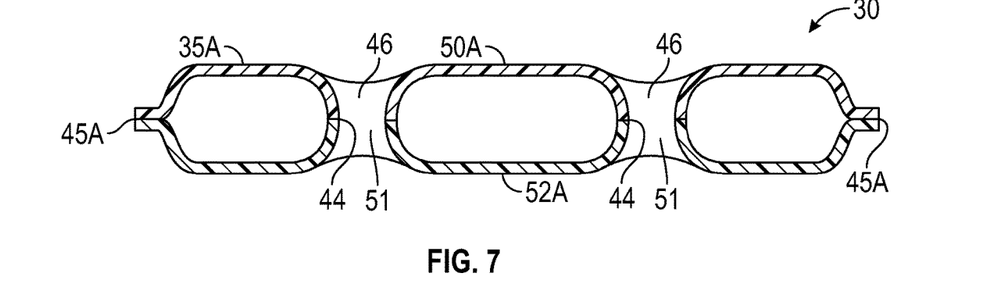
FIG. 7 is a schematic cross-sectional illustration of a second cushioning component of the bladder element of FIG. 2 taken at lines 7-7 in FIG. 2 showing tubular pillars.
Figure 8:
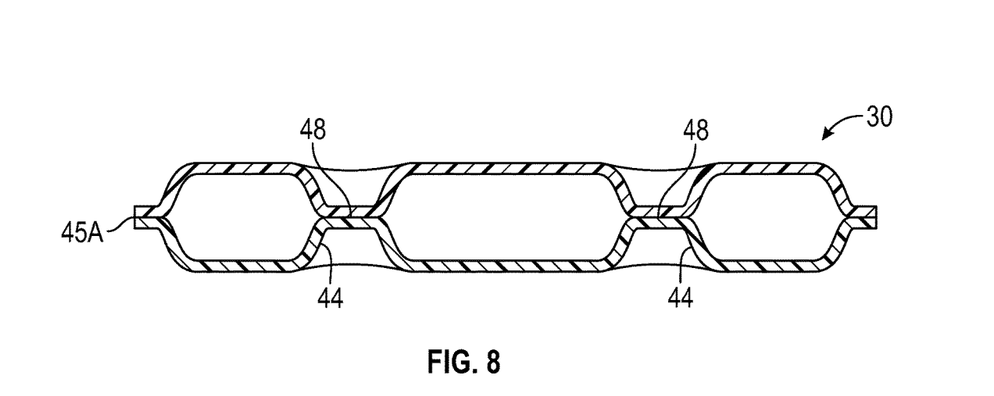
FIG. 8 is a schematic cross-sectional illustration of the bladder element of FIG. 2 taken at the same lines as FIG. 7 prior to punching holes in the bladder element at the centers of the tubular pillars.
Figure 13:
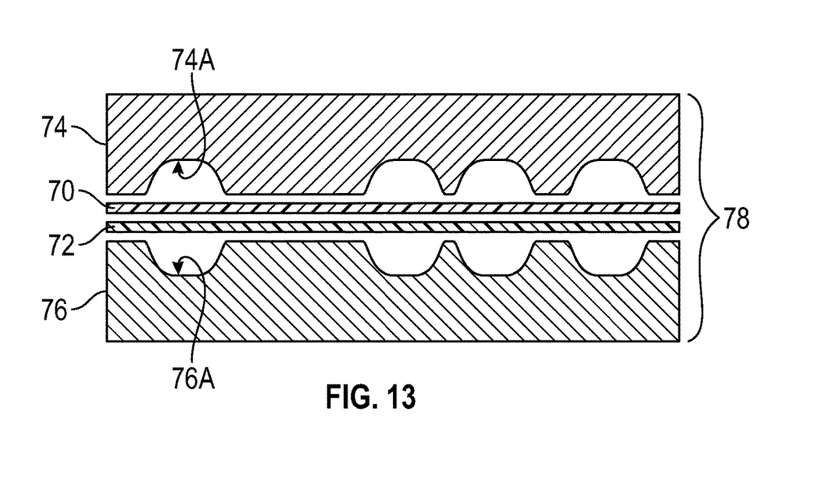
FIG. 13 is a schematic cross-sectional illustration of a mold assembly for thermoforming the bladder element of FIG. 1 from polymer sheets at the same cross-section as FIG. 3.

The cushioning components 35A, 35B, and 35C of FIG. 2 are configured differently than the cushioning components 34A, 34B, and 34C. More specifically, each of the cushioning components 35A, 35B, and 35C has multiple connecting features 44. As shown in FIG. 7 with respect to cushioning component 35A, the connecting features 44 are positioned inward of an outer periphery 45A of the cushioning component 35A. The connecting features 44 connect a first side 50A of the cushioning component 35A to a second side 52A of the cushioning component 35A opposite the first side 50A. In the embodiment of FIG. 2, the connecting features 44 are tubular pillars and may be referred to as such. The material of the bladder element 30 forms the tubular pillars 44. The tubular pillars 44 are hollow, as each includes an opening 46 that extends completely through the tubular pillar 44. The tubular pillars 44 could be originally formed with the opening 46 extending completely therethrough as hollow pillars during forming of the bladder element 30, such as by blow molding or thermoforming the bladder element 30. Alternatively, the material of the bladder element 30 could initially extend across the tubular pillar 44 at a center area 48 as shown in FIG. 8. Holes 51 shown in FIG. 7 are then punched through the bladder element 30 at the center of each tubular pillar 44 so that the tubular pillars 44 are hollow and the opening 46 extends completely therethrough. For example, the bladder element 30 could be formed from a first polymeric sheet 70 and a second polymeric sheet 72 positioned between first and second mold halves 74, 76 of a mold assembly 78. The sheets 70, 72 are vacuum-formed and thermoformed to mold surfaces 74A, 76A shown in FIG. 13, and compression formed to one another at a peripheral flange 79 indicated in FIG. 3 to form all of the cushioning components 34A, 34B, 34C, 35A, 35B, and 36. In such an embodiment, the sheets 70, 72 would initially be bonded to one another at the center area 48 at each of the tubular pillars 44 as shown in FIG. 8. Similarly, the sheets 70, 72 would initially be bonded to one another in the area of the central openings 40A, 40B, 40C, and the central openings 40A, 40B, 40C could be punched out.

The tubular pillars 44 of the cushioning components 35B and 35C are configured in a like manner as described with respect to the tubular pillars 44 of the cushioning component 35A. The cushioning components 35B and 35C are configured similarly to cushioning component 35A, with the tubular pillars 44 positioned inward of an outer periphery 45B, 45C of the cushioning components 35B, 35C, respectively, and connecting a first side to a second side of each of the cushioning components 35B, 35C, as indicated with respect to the cushioning component 35A.

Referring to FIG. 2, the cushioning component 35C is in the heel portion 22 of the sole structure 16 and the article of footwear 10. The cushioning component 35C includes extended tubular portions 60A, 60B that extend along a periphery P of the sole structure 16 in the heel portion 22. More specifically, the tubular portion 60A extends along the periphery P at a lateral extremity 60 of the sole structure 16, and the tubular portion 60B extends along the periphery P at a medial extremity 62 of the sole structure 16. The tubular portions 60A, 60B may be higher in height than the portion of the cushioning component 35C having the tubular pillars 44, thus providing greater support and deflection ability at the periphery P.

The bladder element 30 includes a tubular cushioning component 36 that extends lengthwise along the medial extremity 62 of the sole structure 16 generally at the midfoot portion 20 of the sole structure 16. The cushioning component 36 thus provides cushioning and support for an arch area of the foot 14.

The cushioning component 34A is positioned between the medial extremity 62 and the cushioning component 34B. The cushioning component 34B is positioned between the lateral extremity 60 and the cushioning component 34A. The cushioning component 35A is positioned between the medial extremity 62 and the cushioning component 35B. The cushioning component 35B is positioned between the lateral extremity 60 and the cushioning component 35A. The cushioning components 34A and 35A are generally on a medial side of a longitudinal midline L of the sole structure 16, and the cushioning components 34B, 35B are generally on a lateral side of the longitudinal midline L. The cushioning components 34A, 34B, 35A, and 35B are positioned in the forefoot portion 18 of the sole structure 16. The cushioning component 36 is positioned between the medial extremity 62 and the cushioning component 34C. The cushioning component 34C is positioned between the lateral extremity 60 and the cushioning component 36. The cushioning components 34C and 36 are positioned in the midfoot portion 20 of the sole structure 16. The cushioning component 35C is positioned in the heel portion 22 of the sole structure 16.

In the embodiment of FIG. 2, the cushioning component 34A may be referred to as the first cushioning component, and the cushioning component 35C may be referred to as the second cushioning component. Alternatively, the cushioning component 35A may be referred to as a second cushioning component, the cushioning component 34B may be referred to as a third cushioning component, the cushioning component 35B may be referred to as the fourth cushioning component, and the cushioning component 34C may be referred to as the fifth cushioning component. Any of the cushioning components 35A, 35B, and 35C may simply be referred to as the cushioning component, and any of the cushioning components 34A, 34B, and 34C may be referred to as an additional cushioning component. The cushioning component 34A is rearward of the cushioning component 35A. The cushioning component 34B is rearward of the cushioning component 35B. The cushioning component 34C is rearward of the cushioning component 34B. The cushioning component 35C is rearward of the cushioning component 35B.

The cushioning components 34A, 34B, 34C, 35A, 35B, 35C, and 36 are substantially decoupled from one another. As used herein, outer surfaces of adjacent ones of the cushioning components are "substantially decoupled" from one another if they are connected with one another only by inflation channels or by the tubular cushioning components. In other words, adjacent cushioning components may be indirectly connected to one another by a channel that establishes fluid communication or by the tubular cushioning components, but the outer surfaces of adjacent ones of the cushioning components are not directly connected to one another, nor are they indirectly connected to one another by webbing formed from the material used to form the cushioning components. Adjacent ones of the cushioning components 34A, 34B, 34C, 35A, 35B, 35C, and 36 are disconnected from one another along more than fifty percent of their perimeters. Moreover, the outer surface of any of the cushioning components 34A, 34B, 34C, 35A, 35B, 35C, and 36 is not connected to the outer surface of an adjacent one of the cushioning components either directly or by webbing. As discussed herein, adjacent cushioning components are connected only indirectly by channels, such as channels 80A, 80B, 80C, 80D, 80E, and 80F. Bladder elements typically have webbing between inflated portions. Webbing is uninflated portions of polymeric material used to form a bladder element, such as sheet material. The bladder element 30 has no such webbing and, instead, gaps are provided between the lengths of each adjacent cushioning component. The arrangement of the cushioning components in the bladder element 30 provides cushioning support where needed under the foot 14, while the polymeric material is absent from other areas in order to minimize material waste and enhance flexibility as discussed herein.

The channels 80A, 80B, 80C, 80D, 80E, and 80F connect adjacent ones of the cushioning components 34A, 34B, 34C, 35A, 35B, 35C, and 36 along portions of their perimeters to establish fluid communication between the connected adjacent ones of the cushioning components 34A, 34B, 34C, 35A, 35B, 35C, and 36 when the channels 80A, 80B, 80C, 80D, 80E, and 80F are not sealed. In the embodiment of FIG. 2, the channel 80A connects cushioning component 34A to the cushioning component 35A. The channel 80B connects the cushioning component 34B to the cushioning component 35B. The channel 80C connects the cushioning component 34C to the cushioning component 34B. The channel 80D connects the cushioning component 34A to the cushioning component 34B. The channel 80E connects the cushioning component 34C to the cushioning component 35C. The channel 80F connects the cushioning component 36 to the channel 80E, thereby placing the cushioning component 36 in fluid communication with the cushioning components 34C and 35C. One or more of the channels 80A, 80B, 80C, 80D, 80E, and 80F can be sealed so that the adjacent cushioning components connected by the sealed channel are isolated from fluid communication with one another.

The bladder element 30 includes an inflation port 82 that is disposed at a forward-most periphery 83 of the bladder element 30. Alternatively, the inflation port 82 could be provided at another location along the periphery of the bladder element 30. In the embodiment shown, the inflation port 82 is connected to the cushioning component 35A and is in fluid communication with all of the cushioning components 34A, 34B, 34C, 35A, 35B, 35C, and 36, via the channels 80A, 80B, 80C, 80D, 80E, and 80F when the channels 80A, 80B, 80C, 80D, 80E, and 80F are not sealed.

The channels 80A, 80B, 80C, 80D, 80E, and 80F and the inflation port 82 are formed simultaneously with the cushioning components 34A, 34B, 34C, 35A, 35B, 35C, and 36 by thermoforming or blow molding polymeric material to form the bladder element 30. Accordingly, the cushioning components 34A, 34B, 34C, 35A, 35B, 35C, 36, the channels 80A, 80B, 80C, 80D, 80E, and 80F, and the inflation port 82 are formed simultaneously with one another and are of the same material. The inflation port 82 and the channels 80A, 80B, 80C, 80D, 80E, and 80F are positioned and configured to enable the bladder element 30 to be inflated with and to retain different fluid pressures in different portions of the bladder element 30.

Figure 9:
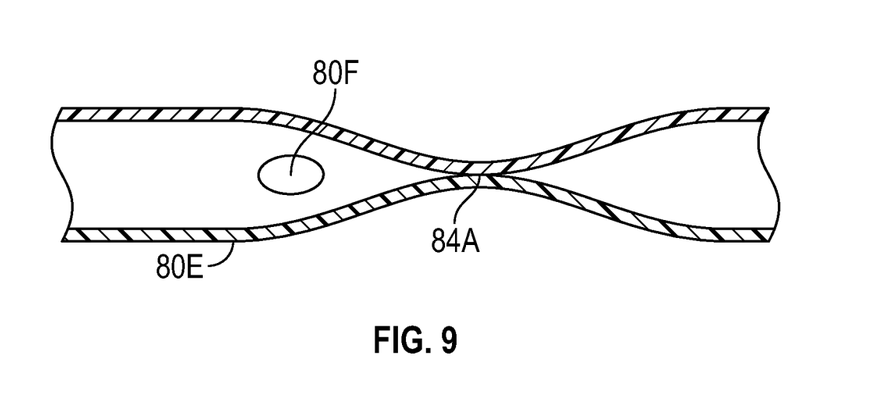
FIG. 9 is a schematic cross-sectional illustration of the bladder element of FIG. 2 taken at lines 9-9 in FIG. 2.

For example, the bladder element 30 may be inflated through the inflation port 82 initially to a first inflation pressure. Next the channel 80E between the cushioning component 34C and the cushioning component 35C can be sealed (i.e., closed) closed such as by thermal bonding of the walls of the channel 80E together to create a weld 84A. Sealing of the channel 80E is indicated at weld 84A in FIG. 9. Closing the channel 80E establishes a final first inflation pressure of the cushioning component 35C in the heel portion 22. Inflation fluid in the remainder of the bladder element 30 (i.e., all of the bladder element 30 between the inflation port 82 and the closed channel 80E, referred to as the first remaining unsealed portion) can be released through the inflation port 82, or can remain in the bladder element 30 as inflation continues. The first remaining unsealed portion of the bladder element 30 is then further inflated through the inflation port 82 to a final second inflation pressure. All portions of the bladder element 30 up to the weld 84A will thus be at the second inflation pressure. Optionally, the second channel 80F can then be sealed such as by thermal bonding of the walls of the channel 80F together to create a weld 84B. Closing the channel 80F, such as by thermal bonding, establishes the final second inflation pressure of the cushioning component 36. Inflation fluid in the remainder of the bladder element 30 between the welds 84A, 84B and the inflation port 82 (referred to as the second remaining unsealed portion) can be released through the inflation port 82 or can remain in the bladder element 30 as inflation continues. The second remaining unsealed portion of the bladder element 30 can then be further inflated through the inflation port 82 to a final third inflation pressure. The inflation port 82 can then be closed, such as by thermal bonding of the walls of the inflation port 82 to one another. This establishes the third inflation pressure as the final inflation pressure of the cushioning components 34A, 34B, 34C, 35A, and 35B. Alternatively, additional sequential inflation can occur with any or all of the remaining channels 80A, 80B, 80C and 80D sealed at welds 84C, 84D, 84E, and 84F, respectively, to establish different inflation pressures in various remaining cushioning components 34A, 34B, 34C, 35A, and 35B. In yet another alternative, none of the channels 80A, 80B, 80C, 80D, 80E, and 80F are closed depending on the desired final inflation pressures and desired ability for fluid communication within the bladder element 30, or one or more of the channels 80A, 80B, 80C, 80D, 80E, and 80F are closed but the inflation pressures in the different portions separated by a closed channel are the same, so that the effect of the closed channel is only to prevent fluid communication between the portions separated by the closed channel.

In an arrangement of the bladder element 30 with the cushioning components 34A, 34B, 34C, 35A, 35B, and 36 as described, various gaps are provided between adjacent ones of the cushioning components 34A, 34B, 34C, 35A, 35B, and 36. For example, the cushioning components 34A and 35A are substantially decoupled from one another, and the cushioning components 34B and 35B are substantially decoupled from one another, so that a gap G1 extends from the lateral extremity 60 to the medial extremity 62 between the substantially decoupled cushioning components 34A and 35A, and between the substantially decoupled cushioning components 34B and 35B. The gap G1 is traversed only by the channels 80A, 80B. The channels 80A and 80B are relatively narrow in width in comparison to the cushioning components 34A, 34B, 35A, 35B, and extend generally longitudinally between the cushioning components 34A, 34B, 35A, and 35B. Accordingly, the channels 80A, 80B do not significantly diminish flexibility of the sole structure 16 in the fore-aft direction at the gap G1.

Similarly, an additional gap G2 is provided extending from the lateral extremity 60 to the medial extremity 62 between the substantially decoupled adjacent cushioning components 36 and 34A, and between the substantially decoupled adjacent cushioning components 34C and 34B. The gap G2 is traversed only by the channel 80C. The channel 80C is relatively narrow in width in comparison to the cushioning components 34A, 34B, 34C, and 36, and extends generally longitudinally between the cushioning components 34B, 34C. Accordingly, the channel 80C does not significantly diminish flexibility of the sole structure 16 in the fore-aft direction at the gap G2.

Another gap G3 extends generally in a longitudinal direction between the substantially decoupled cushioning components 35A and 35B and continues between the substantially decoupled cushioning components 34A, 34B, interrupted only by the channel 80D. The gap G3 allows increased flexibility of the sole structure 16 in a lateral direction between the cushioning components 34A, 34B and between the cushioning components 35A, 35B. The channel 80D is relatively narrow in width in comparison to the cushioning components 34A, 34B, 35A, 35B, and therefore does not significantly diminish flexibility of the sole structure in the lateral direction.

Figure 10:
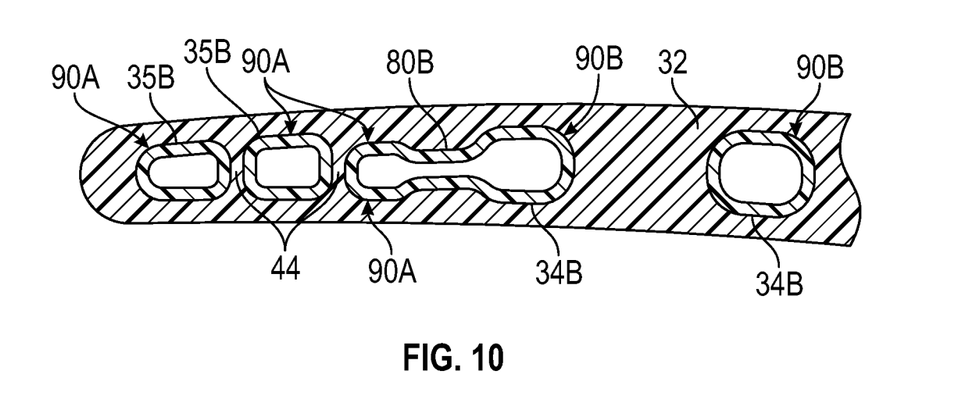
FIG. 10 is a schematic cross-sectional illustration of the sole structure of FIG. 1 taken at lines 10-10 in FIG. 1.

Accordingly, the gaps G1 and G2 serve as flexion regions for flexing of the sole structure 16 in the fore-aft direction, and gap G3 serves as a flexion region for flexing of the sole structure 16 in a lateral direction. Any foam 32 that covers the outer surfaces of the cushioning components 34A, 34B, 34C, 35A, 35B, 35C, and 36 and fills the gaps G1, G2, G3 can be configured to have greater flexibility than the inflated bladder element 30. For example, FIG. 10 shows foam 32 covering outer surfaces 90A, 90B of cushioning components 34B, 35B.

Figure 11:
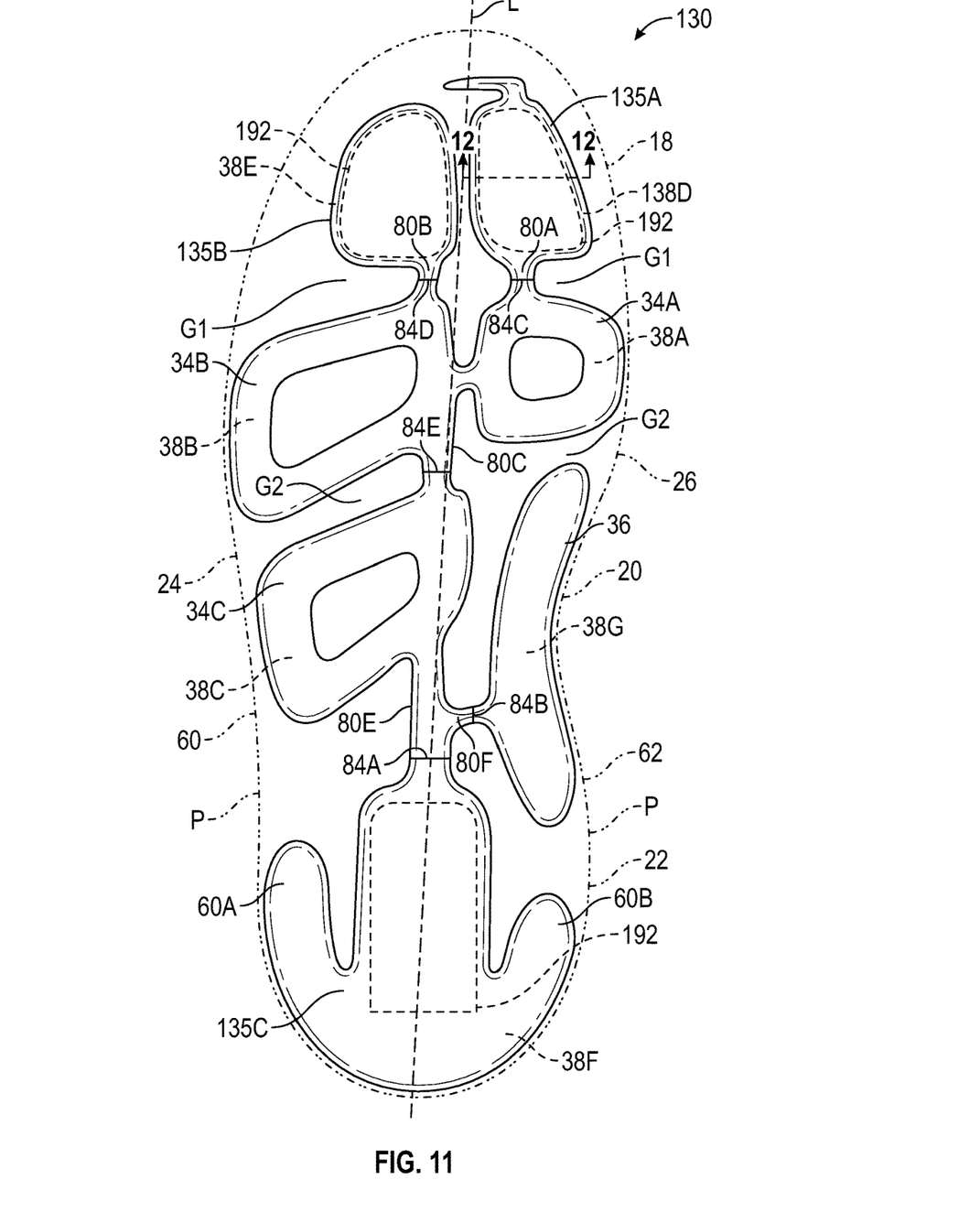
FIG. 11 is a schematic illustration in plan view of a bladder element for the sole structure of FIG. 1 in accordance with an alternative aspect of the present teachings.
Figure 12:
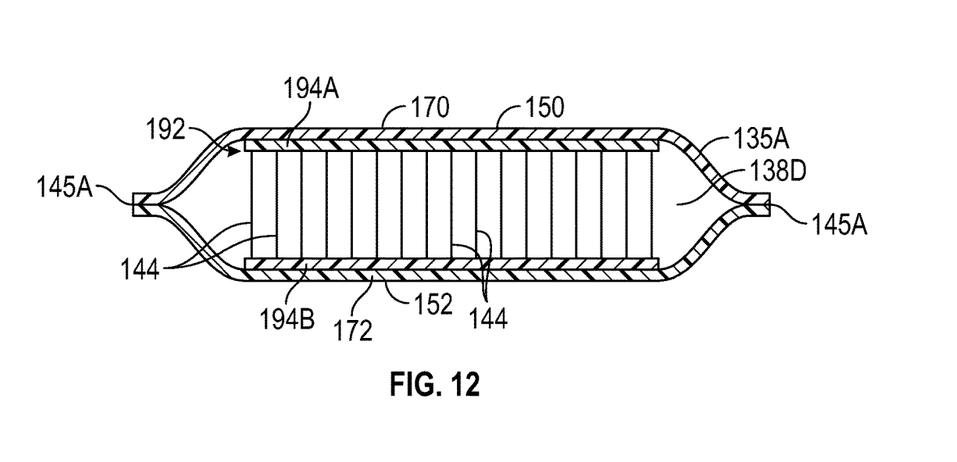
FIG. 12 is a schematic cross-sectional illustration of the bladder element of FIG. 11 taken at lines 12-12 in FIG. 11.

FIG. 11 shows another embodiment of a bladder element 130 that can be used instead of bladder element 30 in the sole structure 16 of FIG. 1. The bladder element 130 has many of the same features as described with respect to bladder element 30, and such features are referenced with the same reference numbers as shown and described with respect to FIG. 2. The bladder element 130 includes cushioning components 135A, 135B, and 135C used in place of cushioning components 35A, 35B, and 35C, respectively. Each of the cushioning components 135A, 135B, and 135C may be referred to as a second cushioning component, and has multiple connecting features 144 positioned inward of an outer periphery of the second cushioning component and connecting a first side of the cushioning component to a second side of the cushioning component. For example, as shown with respect to the cushioning component 135A in FIG. 12. The connecting features 144 are tethers of a tether element 192. The tether element 192 includes a first plate 194A connected to an inner surface of an upper sheet 170 of the cushioning component 135A and a second plate 194B connected to an inner surface of a lower sheet 172 of the cushioning component 135A. Either adhesive bonding or thermal bonding, for example, may be utilized to secure the first and second plates 194A, 194B to the upper and lower sheets 170, 172. The tethers 144 connect the first plate 194A to the second plate 194B and thereby connect a first side 150 of the cushioning component 135A to a second side 152 of the cushioning component 135A. The tether element 192, including the tethers 144 and the plates 194A, 194B, is within a fluid-filled cavity 138D of the cushioning component 135A. The interior cavity 138D is inflated with a fluid that exerts an outward force upon the sheets 170, 172 and the plates 194A, 194B. The tethers 144 extend across the interior cavity 138D and are placed in tension by the outward force of the pressurized fluid upon the sheets 170, 172, thereby preventing the cushioning component 135A from expanding outward and retaining a desired shape of cushioning component 135A. A peripheral bond joins the polymer sheets 170, 172 to form a seal at a peripheral flange 145A that prevents the fluid from escaping, and the tether element 192 prevents the cushioning component 135A from expanding outward or otherwise distending due to the pressure of the fluid. That is, the tether element 192 effectively limits the expansion of interior cavity 138D to retain an intended shape of surfaces of the cushioning component 135A.

The tethers 144 may be formed from any generally elongate material exhibiting a length that is substantially greater than a width and a thickness. Accordingly, suitable materials for tethers 144 include various strands, filaments, fibers, yarns, threads, cables, or ropes that are formed from rayon, nylon, polyester, polyacrylic, silk, cotton, carbon, glass, aramids (e.g., para-aramid fibers and meta-aramid fibers), ultra-high molecular weight polyethylene, liquid crystal polymer, copper, aluminum, and steel. Whereas filaments have an indefinite length and may be utilized individually as tethers 144, fibers have a relatively short length and generally go through spinning or twisting processes to produce a strand of suitable length. An individual filament utilized in tethers 144 may be formed form a single material (i.e., a monocomponent filament) or from multiple materials (i.e., a bicomponent filament). Similarly, different filaments may be formed from different materials. As an example, yarns utilized as tethers 144 may include filaments that are each formed from a common material, may include filaments that are each formed from two or more different materials, or may include filaments that are each formed from two or more different materials. Similar concepts also apply to threads, cables, or ropes. The thickness of tethers 144 may also vary significantly to range from 0.03 millimeters to more than 5 millimeters, for example. The tethers 144 may have various shapes in a cross-section perpendicular to their length (e.g., a round, a square, a rectangular, an oval, or otherwise closed shape in cross-section). Tethers 144 are arranged in rows that extend longitudinally along the lengths of plates 194A and 194B. Only one row is shown in the cross-sectional view of FIG. 12.

The cushioning components 135B and 135C are configured in a similar manner and the tether elements 192 within the cushioning components 135B and 135C are indicated with hidden lines in FIG. 11. The cushioning components 135A, 135B, and 135C are substantially decoupled from the cushioning components 134A, 134B, 134C, and 136, and from one another, in substantially the same manner as discussed with respect to the cushioning components 35A, 35B, and 35C of FIG. 2.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative only and not as limiting.

The invention claimed is:

1. An article of footwear comprising:
a sole structure having a bladder element that comprises multiple cushioning components each including an enclosed fluid-filled cavity; wherein the bladder element has an upper sheet and a lower sheet that together form the cushioning components; wherein the cushioning components comprise:
a first cushioning component having:
a single central opening extending completely therethrough; and
a continuous fluid-filled cavity surrounding the central opening; and
a second cushioning component having multiple connecting features positioned inward of an outer periphery of the second cushioning component and connecting a first side of the second cushioning component to a second side of the second cushioning component opposite the first side;
wherein the cushioning components are spaced apart from one another so that an outer surface of each of the cushioning components is substantially decoupled from an outer surface of an adjacent one of the cushioning components; and the single central opening is free from foam or other structure.

2. The article of footwear of claim 1, wherein the connecting features are tubular pillars.

3. The article of footwear of claim 2, wherein at least one of the tubular pillars comprises an opening extending completely through said at least one of the tubular pillars.

4. The article of footwear of claim 1, wherein the connecting features are tethers positioned within the fluid-filled cavity of the second cushioning component.

5. The article of footwear of claim 1, wherein:
the cushioning components comprise a third cushioning component and a fourth cushioning component;
the third cushioning component includes:
a single central opening extending completely therethrough; and
a continuous fluid-filled cavity surrounding the central opening of the third cushioning component;
the fourth cushioning component includes multiple connecting features positioned inward of an outer periphery of the fourth cushioning component and connecting a first side of the fourth cushioning component to a second side of the fourth cushioning component opposite the first side of the fourth cushioning component;
the first cushioning component is positioned between a medial extremity of the sole structure and the third cushioning component;
the third cushioning component is positioned between a lateral extremity of the sole structure and the first cushioning component;
the second cushioning component is positioned between the medial extremity of the sole structure and the fourth cushioning component; and
the fourth cushioning component is positioned between the lateral extremity of the sole structure and the second cushioning component.

6. The article of footwear of claim 5, wherein:
the cushioning components comprise a fifth cushioning component having:
a single central opening extending completely therethrough; and
a continuous fluid-filled cavity surrounding the central opening of the fifth cushioning component;
the fifth cushioning component is rearward of the third cushioning component and positioned in a midfoot portion of the sole structure.

7. The article of footwear of claim 1, wherein the cushioning components comprise a tubular cushioning component extending lengthwise along a medial extremity of the sole structure in a midfoot portion of the sole structure.

8. The article of footwear of claim 1, wherein:
the first cushioning component and the second cushioning component are both positioned in a forefoot portion of the sole structure; and
the second cushioning component is positioned forward of the first cushioning component.

9. The article of footwear of claim 1, wherein the bladder element includes channels connecting adjacent ones of the cushioning components and establishing fluid communication between said adjacent ones of the cushioning components.

10. The article of footwear of claim 9, wherein:
at least one of the channels is sealed so that the adjacent ones of the cushioning components connected by the sealed channel are isolated from fluid communication with one another by the sealed channel.

11. The article of footwear of claim 10, wherein the adjacent ones of the cushioning components connected by the sealed channel have different inflation pressures.

12. The article of footwear of claim 1, wherein a gap is provided between adjacent ones of the cushioning components and extends from a medial extremity to a lateral extremity of the sole structure.

13. The article of footwear of claim 1, wherein the first cushioning component is a regular ring torus or an irregular ring torus.

14. The article of footwear of claim 1, wherein the second cushioning component is in a heel portion of the article of footwear and includes tubular portions extending along a periphery of the sole structure in the heel portion.

15. An article of footwear comprising:
a sole structure having a bladder element that comprises a cushioning component; wherein the bladder element has an upper sheet and a lower sheet that together form the cushioning component; wherein the cushioning component includes:
a fluid-filled cavity;
multiple tubular pillars positioned inward of an outer periphery of the cushioning component and connecting a first side of the cushioning component to a second side of the cushioning component opposite the first side such that the fluid-filled cavity surrounds the tubular pillars;
wherein at least one of the tubular pillars comprises an opening extending completely therethrough;
an additional cushioning component including:
a single central opening extending completely therethrough; and
a continuous fluid-filled cavity surrounding the central opening;
wherein the bladder element further comprises a channel connecting the cushioning component to the additional cushioning component;
wherein the upper sheet and a lower sheet together form the additional cushioning component and the channel; and
the single central opening is free from foam or other structure.

16. The article of footwear of claim 15, wherein the channel is sealed such that the fluid-filled cavity of the cushioning component is isolated from fluid communication with the fluid-filled cavity of the additional cushioning component by the sealed channel.

17. The article of footwear of claim 15, wherein the cushioning component is in one of a forefoot portion of the sole structure and a heel portion of the sole structure.

18. The article of footwear of claim 17, wherein:
the cushioning component is in the heel portion of the sole structure and includes tubular portions extending along an edge of the sole structure in the heel portion.

* * * * *